United States Patent
Bonham

(10) Patent No.: US 8,931,115 B1
(45) Date of Patent: Jan. 13, 2015

(54) MICROFIBER CLEANING CLOTH CLOTHING ARTICLE AND METHOD OF ASSEMBLY

(71) Applicant: Nathanael Moon Bonham, Alpine, UT (US)

(72) Inventor: Nathanael Moon Bonham, Alpine, UT (US)

(73) Assignee: Nathanael Moon Bonham, Alpine, UT (US)

( * ) Notice: Subject to any disclaimer, the term of this patent is extended or adjusted under 35 U.S.C. 154(b) by 26 days.

(21) Appl. No.: 13/707,361

(22) Filed: Dec. 6, 2012

Related U.S. Application Data

(60) Provisional application No. 61/568,245, filed on Dec. 8, 2011.

(51) Int. Cl.
- *A47L 13/16* (2006.01)
- *A41D 25/16* (2006.01)
- *A47L 25/00* (2006.01)

(52) U.S. Cl.
CPC .............. *A41D 25/16* (2013.01); *A47L 13/16* (2013.01); *A47L 25/00* (2013.01)
USPC ............. 2/144; 2/279; 2/272; 15/208; 15/105

(58) Field of Classification Search
None
See application file for complete search history.

(56) References Cited

U.S. PATENT DOCUMENTS

| | | | | |
|---|---|---|---|---|
| 1,339,330 A * | 5/1920 | Goelkel | ............................. | 206/6 |
| 1,772,575 A * | 8/1930 | Costanzo | ........................... | 2/150 |
| 2,204,947 A * | 6/1940 | Apfelbaum | ....................... | 15/208 |
| 2,233,746 A * | 3/1941 | Potter | ........................... | 15/209.1 |
| 4,525,411 A * | 6/1985 | Schmidt | ........................ | 428/198 |
| 4,854,449 A * | 8/1989 | Fitzhugh | ......................... | 206/37 |
| 5,083,661 A * | 1/1992 | Burwell | ........................... | 206/37 |
| 5,142,703 A * | 9/1992 | Basinger et al. | .................. | 2/144 |
| 5,150,504 A * | 9/1992 | Cohen | ............................. | 24/302 |
| 5,694,659 A * | 12/1997 | Merrion | ........................... | 15/214 |
| 6,115,841 A * | 9/2000 | Thompson et al. | ................ | 2/144 |
| 6,233,741 B1 * | 5/2001 | Loree et al. | ...................... | 2/157 |
| 6,638,611 B2 * | 10/2003 | Seth | ........................... | 428/304.4 |
| 6,849,135 B2 * | 2/2005 | Jones | .............................. | 134/6 |
| 6,881,273 B1 * | 4/2005 | Oberman | ......................... | 134/6 |
| 6,977,113 B2 * | 12/2005 | Kody et al. | ................. | 428/292.1 |
| 7,178,193 B2 * | 2/2007 | Jones | ........................... | 15/209.1 |
| 7,413,614 B2 * | 8/2008 | Jones | ................................ | 134/6 |
| 7,431,983 B2 * | 10/2008 | Amano | ........................ | 428/319.3 |
| 7,743,456 B2 * | 6/2010 | McDonnell | ..................... | 15/247 |
| 8,060,969 B2 * | 11/2011 | Jones | .............................. | 15/105 |
| 8,151,399 B2 * | 4/2012 | Jones | ........................... | 15/209.1 |
| D658,834 S * | 5/2012 | Davis | ............................ | D32/43 |
| D659,320 S * | 5/2012 | Davis | ............................ | D32/43 |
| D659,321 S * | 5/2012 | Davis | ............................ | D32/43 |
| D659,322 S * | 5/2012 | Davis | ............................ | D32/43 |
| D659,323 S * | 5/2012 | Davis | ............................ | D32/43 |
| D659,324 S * | 5/2012 | Davis | ............................ | D32/43 |
| D659,325 S * | 5/2012 | Davis | ............................ | D32/43 |
| D659,326 S * | 5/2012 | Davis | ............................ | D32/43 |
| D659,327 S * | 5/2012 | Davis | ............................ | D32/43 |
| D659,328 S * | 5/2012 | Davis | ............................ | D32/43 |
| D659,329 S * | 5/2012 | Davis | ............................ | D32/43 |
| D659,330 S * | 5/2012 | Davis | ............................ | D32/43 |
| D659,331 S * | 5/2012 | Davis | ............................ | D32/43 |

(Continued)

*Primary Examiner* — Bobby Muromoto, Jr.

(74) *Attorney, Agent, or Firm* — Kilpatrick Townsend & Stockton LLP; Kenneth R. Allen

(57) ABSTRACT

Microfiber cloth is attached to articles of regularly worn clothing, including shirt tails, neckties, scarves, sweaters, pants or other clothing article, making the microfiber cloth more accessible and ready to use for cleaning surfaces of personal devices.

4 Claims, 4 Drawing Sheets

(56) References Cited

U.S. PATENT DOCUMENTS

| | | | | |
|---|---|---|---|---|
| D659,332 S | * | 5/2012 | Davis | D32/43 |
| D661,443 S | * | 6/2012 | Davis | D32/43 |
| D661,444 S | * | 6/2012 | Davis | D32/43 |
| D661,445 S | * | 6/2012 | Davis | D32/43 |
| D661,446 S | * | 6/2012 | Davis | D32/43 |
| 8,490,238 B2 | * | 7/2013 | Sohn | 15/209.1 |
| 8,499,406 B2 | * | 8/2013 | Fava | 15/247 |
| 2002/0000455 A1 | * | 1/2002 | Condliff et al. | 224/162 |
| 2002/0155234 A1 | * | 10/2002 | Seth | 428/35.2 |
| 2003/0121114 A1 | * | 7/2003 | Waite | 15/28 |
| 2006/0168755 A1 | * | 8/2006 | Langerak | 15/320 |
| 2007/0135011 A1 | * | 6/2007 | Amano | 442/396 |
| 2009/0235478 A1 | * | 9/2009 | England | 15/214 |
| 2012/0090121 A1 | * | 4/2012 | Phillips et al. | 15/210.1 |
| 2012/0315473 A1 | * | 12/2012 | Chin | 428/343 |

* cited by examiner

MICROFIBER CLEANING CLOTH CLOTHING ARTICLE AND METHOD OF ASSEMBLY

CROSS-REFERENCES TO RELATED APPLICATIONS

The present application claims benefit under 35 USC 119 (e) of U.S. provisional Application No. 61/568,245, filed on Dec. 8, 2011, titled "Microfiber Cleaning Cloth Clothing Article and Method of Assembly," the content of which is incorporated herein by reference in its entirety.

BACKGROUND OF THE INVENTION

This invention relates to methods and apparatus for cleaning smooth surfaces of personal devices such as cell phone screens, eye glasses, and electronic screens and the like.

Microfiber cloth has been developed for cleaning smooth surfaces. Examples of products in which such surfaces are found include eyeglasses, cell phones, MP3 players, computers, televisions and other articles with display screens. A microfiber cloth is designed to attract dust and remove oil on contact with the glass surface.

It is a common practice to use shirttails and the like clothing to casually and occasionally clean such surfaces of personal devices. However convenient this may be, this method is often unsatisfactory because the fabric of clothing is unsuitable to clean such surfaces, spreading contaminants instead of removing oil and dust.

What is needed is an effective and convenient method and device for casual cleaning of glass surfaces.

BRIEF SUMMARY OF THE INVENTION

According to the invention, a piece of microfiber cloth is attached to an article of fabric having another purpose, such as an article of regularly worn clothing. The attachment sites include a shirt tail, a necktie, pants, pockets, lapels, scarves or other clothing article that is regularly worn, making the microfiber cloth more accessible and ready to use for cleaning glass surfaces of personal devices. Microfiber cloth is attached to clothing in convenient and unobtrusive locations using an attachment medium, such as a heat-activated adhesive interlayer or iron-on cloth piece. The cloth piece is preferably shaped to fit the shape of the clothing area that serves as a support base or backing.

In a particular embodiment, the microfiber cloth is covered by a protective flap or disposed in a protective pocket.

The article of clothing is transformed into a cleaning cloth when the microfiber piece is attached to the article of clothing.

The method of attachment is preferably by means of a heat activated adhesive sheet, but other attachment means, such as thread are contemplated.

The invention will be better understood by reference to the following detailed description in connection with accompanying drawings.

DETAILED DESCRIPTION OF THE INVENTION

Figure 1:
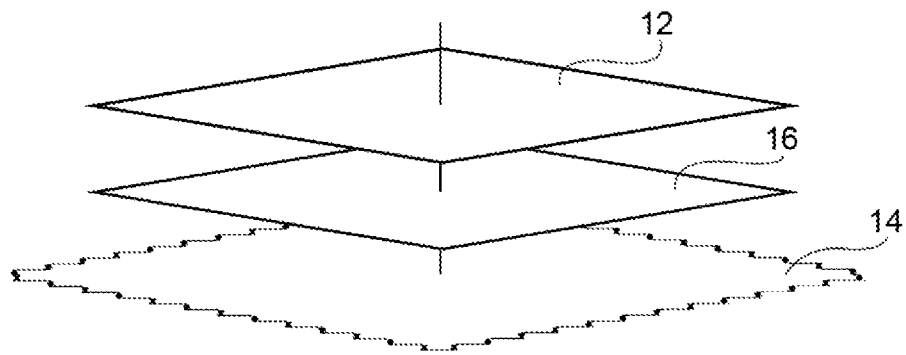
FIG. 1 is an exploded view of a generic structure according to the invention.

FIG. 1 is a depiction of a generalized embodiment of the invention 10. Herein, a microfiber cloth 12 is attached to a fabric backing article or substrate 14 of clothing by means of an interlayer of a heat activated sheet 16, namely an iron-on cloth sheet. The invention could be provided as a kit comprising the microfiber cloth sheet 12 and the heat-activated sheet 16 both suitably pre-sized or cut to size to match a particular attachment site of a substrate. While various types of microfiber cloths are known and available, the preferred type for this purpose is a lightweight microfiber sheet that is flat woven fabric designed for leaving a streak-free finish on glass. The weave of split polyester/polyamide blend microfiber yarn is designed for absorption while leaving no lint. Split fibers create open spaces in the fiber which give absorbability. Specifications are 80% polyester/20% polyamide; denier: 0.1-0.2; weight: 200 grams per square meter.

It is conventional wisdom that a microfiber cloth cannot be ironed because of the risk of clogging the split fibers. To address and overcome this problem, the iron-on sheet 16 and the substrate 14 are placed between the heat source (hot iron) and the microfiber cloth 12, the assembly is placed on a cold heat sink, and the heat source is applied at the lowest effective heat setting for the shortest effective time. Alternatively, heat is applied only to the margins of the cloth sheet and its heat-sensitive backing, leaving the untreated center area of sufficient size for the cleaning function. The untreated center area can be protected by a layer of heat-insulative material that is smaller than the extent of the side margins of the iron-on attachment. While sewing is an alternative, the preferred embodiment is as an iron-on attachment.

Figure 2A:
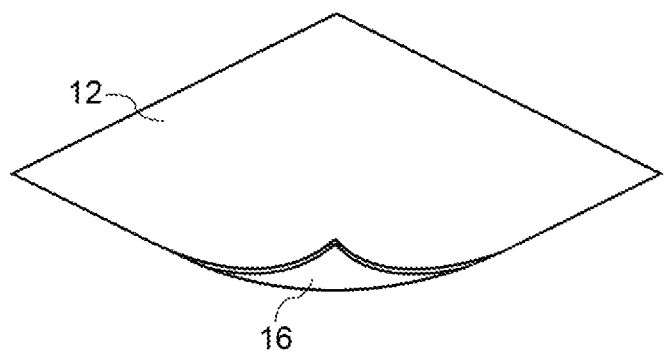
FIG. 2A is a perspective view of the article prior to attachment.
Figure 2B:
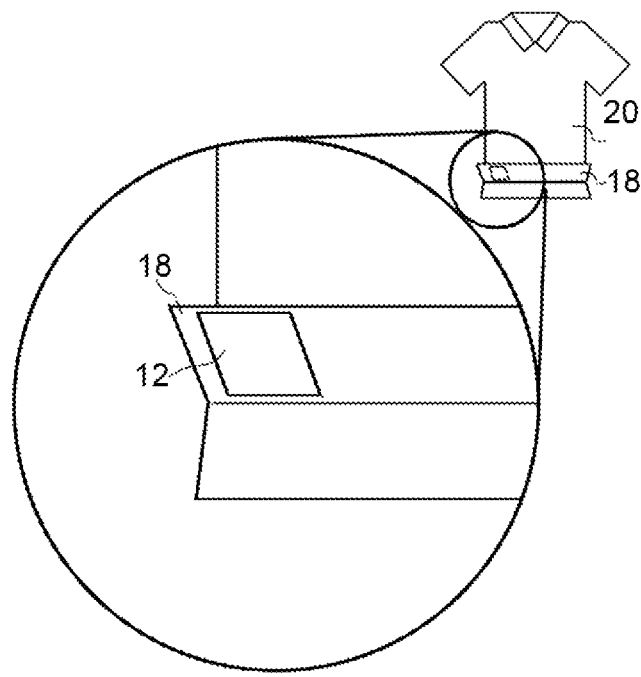
FIG. 2B is a magnified view of one embodiment of the invention incorporated into a shirt.

FIG. 2A is an example of the microfiber cloth 12 with the adhesive sheet 16 or layer pre-attached. In the example of FIG. 2B, the attachment site of the microfiber cloth 12 is the tail 18 of a shirt 20 or like blouse or sweater.

Figure 3:
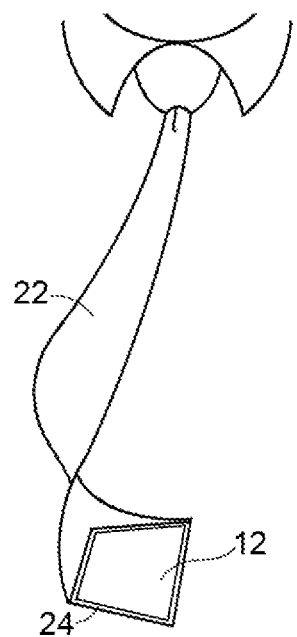
FIG. 3 is perspective view of another embodiment of the invention incorporated into a necktie.

FIG. 3 illustrates the example of a necktie 22 wherein a shaped piece of microfiber cloth 12 is attached to the end 24 of the necktie 22, hidden but readily accessible to a user.

Figure 4:
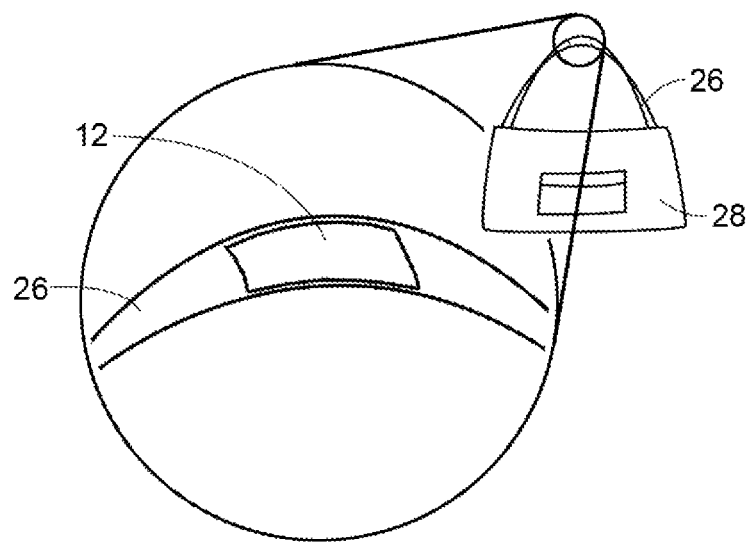
FIG. 4 is a magnified view of another embodiment of the invention incorporated into the handle strap of a handbag.

FIG. 4 is an example of a microfiber cloth 12 incorporated into the shoulder strap 26 of a handbag 28, including a computer bag or the like.

Figure 5:
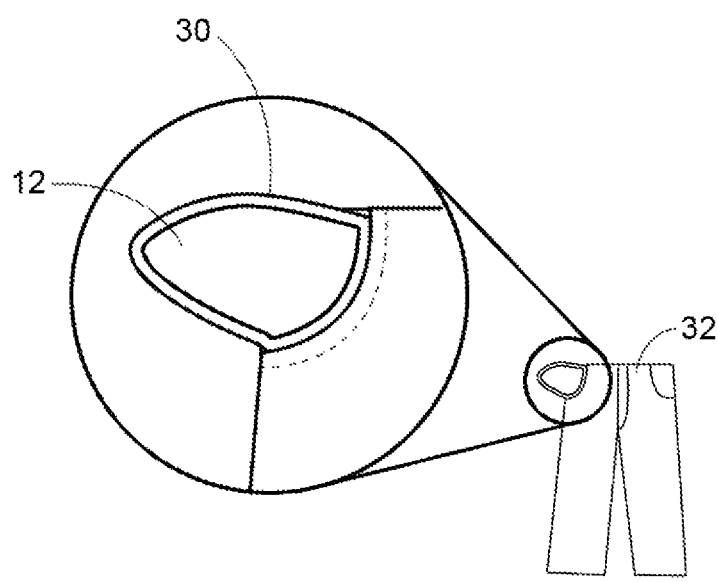
FIG. 5 is a magnified view of another embodiment of the invention incorporated into a representative pocket such as a pant pocket forming a protective cover.

FIG. 5 shows an example of a microfiber cloth 12 attached to a pocket 30 of a pant 32. in which it is cut to the shape of the pocket 30. the pocket, when closed thus covers and protects the microfiber cloth 12. A pocket sized-device such as a cell phone may have its screen cleaned merely by placing it in the pocket 30 with the screen facing the cloth and then rubbing the screen against the sheet, backed by the body of the wearer.

Figure 6:
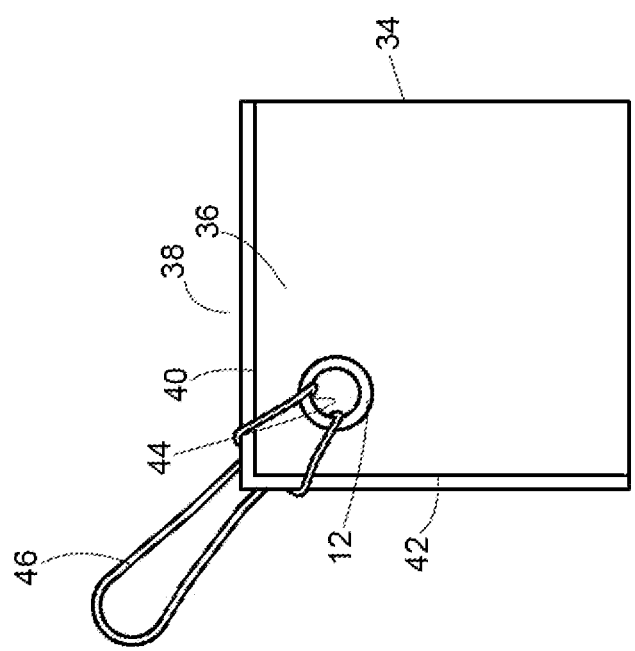
FIG. 6 is a top view of another embodiment incorporated into a carried article that encloses the cleaning cloth.

FIG. 6 depicts a portable article 34 planar in shape with a front cover 36 and a back cover 38 which can be opened along margins 40 and 42 to expose a microfiber cloth 12 adhering to one of the cover 36, 38. The article 34 with protective covers may have a hole 44 that is used to hold the article closed by means of a strap 46 looped through the hole 44. Releasing the strap 46 opens the article 34.

Articles to which a microfiber sheet 12 may be attached flush to provide a cleaning medium for screens and the like include shirt tails, scarves, sweaters, pants, ties, gloves, purses, lapels, bags or other articles and clothing that are regularly worn or carried, making the microfiber cloth more accessible and ready to use.

Adhesives and attachment media that could be used include, but are not limited to: Iron-on adhesive tape, liquid iron-on adhesive, superglue, hot glue, epoxy, liquid cement, sewn thread, etc. It is preferred and has been determined that the iron-on adhesive tape is preferred for convenience and longevity.

The invention has been explained with reference to specific embodiments. The claims are incorporated into the description of the invention. Other embodiments will be evident to those of skill in the art. It is therefore not intended that the invention be limited, except as indicated by the appended claims.

What is claimed is:

1. A method for forming a cleaning article comprising:
   placing a heat-activated adhesive medium sheet upon a mating surface of a fabric article, the adhesive medium sheet being shaped to conform with the mating surface of the fabric article;
   placing the microfiber cloth sheet upon the heat-activated medium sheet, the microfiber cloth sheet being shaped to conform with the mating surface of the fabric article; thereafter
   placing a heat-insulative material sheet against the microfiber cloth sheet to cover the microfiber cloth sheet, the heat-insulative material being smaller than the extent of margins of the microfiber cloth sheet;
   applying sufficient heat to activate the heat-activated adhesive medium at at least the margins of the microfiber cloth sheet in order to attach the microfiber cloth sheet flush to the mating surface of the fabric article with the adhesive medium sheet to add a cleaning element to the fabric article.

2. The method according to claim 1 wherein the applying step comprises pressing a hot iron against the heat-insulative medium.

3. An article for cleaning smooth surfaces comprising:
   a fabric article;
   a microfiber cloth sheet; and
   a heat-activated adhesive medium sheet, the microfiber cloth sheet being attached to the fabric article by:
   placing the heat-activated adhesive medium sheet upon a mating surface of a fabric article, the adhesive medium sheet being shaped to conform with the mating surface of the fabric article;
   placing the microfiber cloth sheet upon the heat-activated medium sheet, the microfiber cloth sheet being shaped to conform with the mating surface of the fabric article; thereafter
   placing a heat-insulative material sheet against the microfiber cloth sheet to cover the microfiber cloth sheet, the heat-insulative material being smaller than the extent of margins of the microfiber cloth sheet;
   applying sufficient heat to activate the heat-activated adhesive medium at at least the margins of the microfiber cloth sheet in order to attach the microfiber cloth sheet flush to the mating surface of the fabric article to add a cleaning element to the fabric article;
   the fabric article selected from the group consisting of a necktie, a shirt, a blouse, a handbag, an accessory tag, a pocket, a trouser.

4. An article for cleaning smooth surfaces comprising:
   a fabric article; and
   a microfiber cloth sheet suitable for use in cleaning, the microfiber cloth sheet having on one side a coating of a heat-activated adhesive, the microfiber cloth sheet being attached to the fabric article by:
   placing the microfiber cloth sheet with its side with the heat-activated medium against the fabric article, the microfiber cloth sheet being shaped to conform with the mating surface of the fabric article; thereafter
   placing a heat-insulative material sheet against the microfiber cloth sheet to cover the microfiber cloth sheet, the heat-insulative material being smaller than the extent of margins of the microfiber cloth sheet;
   applying sufficient heat to activate the heat-activated adhesive medium at at least the margins of the microfiber cloth sheet in order to attach the microfiber cloth sheet flush to the mating surface of the fabric article to add a cleaning element to the fabric article;
   the fabric article selected from the group consisting of a necktie, a shirt, a blouse, a handbag, an accessory tag, a pocket, a trouser.

\* \* \* \* \*